United States Patent
Toyama (10) Patent No.: US 9,402,267 B2
(45) Date of Patent: Jul. 26, 2016

(54) RADIO BASE STATION AND COMMUNICATION CONTROL METHOD

(75) Inventor: Daisuke Toyama, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 224 days.

(21) Appl. No.: 13/638,841

(22) PCT Filed: Mar. 31, 2011

(86) PCT No.: PCT/JP2011/058257
§ 371 (c)(1),
(2), (4) Date: Oct. 1, 2012

(87) PCT Pub. No.: WO2011/125856
PCT Pub. Date: Oct. 13, 2011

(65) Prior Publication Data
US 2013/0016691 A1   Jan. 17, 2013

(30) Foreign Application Priority Data

Apr. 2, 2010  (JP) ................. 2010-086531

(51) Int. Cl.
*H04W 72/04* (2009.01)
*H04W 72/12* (2009.01)
*H04W 88/08* (2009.01)

(52) U.S. Cl.
CPC .......... *H04W 72/1252* (2013.01); *H04W 88/08* (2013.01)

(58) Field of Classification Search
None
See application file for complete search history.

(56) References Cited

U.S. PATENT DOCUMENTS

| 2010/0128686 A1* | 5/2010 | Nishio et al. .................. 370/329 |
| 2010/0232388 A1 | 9/2010 | Nakao et al. |
| 2011/0141998 A1* | 6/2011 | Nishio et al. .................. 370/329 |
| 2012/0207124 A1* | 8/2012 | Liu et al. ....................... 370/329 |

FOREIGN PATENT DOCUMENTS

| JP | 2010-028334 A | 2/2010 |
| WO | 2009/057286 A1 | 5/2009 |
| WO | 2010/018684 A1 | 2/2010 |
| WO | WO2010018684 | * 2/2010 ......... H04W 72/042 |

OTHER PUBLICATIONS

An Office Action; "Notice of Reasons for Rejection," issued by the Japanese Patent Office on Jul. 30, 2013, which corresponds to Japanese Patent Application No. 2010-086531 and is related to U.S. Appl. No. 13/638,841; with Statement of Relevance.

(Continued)

*Primary Examiner* — Ayaz Sheikh
*Assistant Examiner* — Sori Aga
(74) *Attorney, Agent, or Firm* — Studebaker & Brackett PC (57) ABSTRACT

An LTE base station 1 determines whether or not a timing for setting a logical area arrives. When the timing for setting a logical area arrives, the LTE base station 1 acquires an uplink traffic volume and a downlink traffic volume in radio communication with a radio terminal 2. On the basis of the uplink traffic volume and the downlink traffic volume, the LTE base station 1 sets an uplink dedicated logical area, a downlink dedicated logical area and a shared logical area in a logical area for one PDCCH.

13 Claims, 5 Drawing Sheets

(56) References Cited

OTHER PUBLICATIONS

International Search Report; JP2011/058257; Apr. 26, 2011.
3GPP TS 36.213 V8.4.0 (Sep. 2008); 3rd Generation Partnership Project; Technical Specification Group Radio Access Network; Evolved Universal Terrestrial Radio Access (E-UTRA); Physical layer procedures (Release 8).

* cited by examiner

RADIO BASE STATION AND COMMUNICATION CONTROL METHOD

TECHNICAL FIELD

The present invention relates to a radio base station configured to assign a downlink radio channel to a radio terminal, and a communication control method in the radio base station.

BACKGROUND ART

A radio communication system employing LTE (Long Term Evolution) uses OFDMA (Orthogonal Frequency Division Multiplexing Access) for a downlink communication from a radio base station to a radio terminal and SC-FDMA (Single Carrier Frequency Division Multiple Access) for an uplink communication from a radio terminal to a radio base station. These multiplexing schemes implement user multiplexing by allocating radio channels in two dimensions, i.e., frequency and time.

In order to efficiently transmit data to multiple radio terminals in a communication area, a radio base station performs packet scheduling on each radio terminal, and assigns thereto an uplink radio channel and a downlink radio channel.

In addition, in order to notify a radio terminal of the assignment of radio channels to an uplink and a downlink, a radio base station needs to transmit information for assignment control of an uplink radio channel (uplink assignment control information) and information for assignment control of a downlink radio channel (downlink assignment control information) by using PDCCH (Physical Downlink Control CHannel) being a radio channel for control information in a downlink. However, since the resources for PDSCH (Physical Downlink Shared CHannel) being a radio channel for user information in a downlink need to be sufficiently reserved, a few resources are left for PDCCH. For this reason, when the uplink assignment control information and the downlink assignment control information are to be assigned to a logical area of PDCCH, cooperation and negotiation between assignment processing of uplink assignment control information and assignment processing of uplink assignment control information are required to prevent one-sided assignment.

Additionally, in radio communication techniques in recent years, retransmission in the occurrence of transmission error has been an important problem. As for this problem, an error correction technique called hybrid automatic repeat request (HARQ) in a lower layer is introduced. HARQ is a technique in which automatic repeat request (ARQ) and error detection using forward error correction code (FEC) are combined with each other to improve error detection capability in a receiving apparatus.

CITATION LIST

Non-Patent Literature

Non-Patent Literature: 3GPP TS 36.213 V8.4.0 "Technical Specification Group Radio Access Network; Evolved Universal Terrestrial Radio Access (E-UTRA); Physical Layer procedures (Release 8)"

SUMMARY OF THE INVENTION

However, the above-described cooperation and negotiation between assignment processing of uplink assignment control information and assignment processing of downlink assignment control information impose a large load on the assignment.

Moreover, in the case of particularly using HARQ in an uplink, a radio base station can assign downlink assignment control information immediately upon arrival of a period in which the information can be assigned to PDCCH. However, a radio base station cannot immediately assign uplink assignment control information. This is because a radio base station needs to perform error detection on a signal transmitted through the uplink and then to assign the uplink assignment control information depending on a result of the error detection. Accordingly, a start timing for assigning uplink assignment control information lags behind a start timing for assigning downlink assignment control information. This situation inevitably requires cooperation and negotiation for the assignment processing which impose a large load on the assignment.

Accordingly, an object of the present invention is to provide a radio base station and a communication control method for appropriately assigning information to a downlink radio channel without increasing a load on the assignment.

To solve the above mentioned problem, the present invention has following features. A first feature of the present invention is summarized as a radio base station (LTE base station 1) configured to assign a radio channel to a radio terminal (radio terminal 2-1, radio terminal 2-2), comprising an uplink dedicated area setting unit (logical area setting unit 154) configured to set an area dedicated to uplink control information for control of a radio channel in an uplink, in a logical area of a radio channel in a downlink.

In such a radio base station, when a start of assigning uplink control information to a downlink radio channel lags behind a start of assigning downlink control information to a downlink radio channel, an area dedicated to uplink control information is set in a logical area of a downlink radio channel and thus no downlink control information is assigned to the area dedicated to the uplink control information. Accordingly, without cooperation or negotiation for assignment processing, it is possible to prevent biased assignment in which a large volume of downlink control information is assigned to a downlink radio channel and a small volume of uplink control information is assigned to the downlink radio channel.

A second feature of the present invention is summarized as the radio base station, wherein the uplink dedicated area setting unit sets at least one of the size and number of areas dedicated to the uplink control information in accordance with a traffic volume in the uplink.

A third feature of the present invention is summarized as the radio base station, comprising a downlink dedicated area setting unit (logical area setting unit 154) configured to set an area dedicated to downlink control information for control of a radio channel in a downlink, in the logical area of the radio channel in the downlink.

A fourth feature of the present invention is summarized as the radio base station, wherein the downlink dedicated area setting unit sets at least one of the size and number of areas dedicated to the downlink control information in accordance with a traffic volume in the downlink.

A fifth feature of the present invention is summarized as the radio base station, comprising a shared area setting unit (logical area setting unit 154) configured to set an area shared by downlink control information for control in the downlink and uplink control information for control in the uplink in the logical area of the radio channel in the downlink.

A sixth feature of the present invention is summarized as the radio base station, wherein the shared area setting unit sets at least one of the size and number of shared areas in accordance with a traffic volume in the downlink and a traffic volume in the uplink.

A seventh feature of the present invention is summarized as a communication control method in a radio base station configured to assign a radio channel to a radio terminal, comprising setting, by the radio base station, an area dedicated to uplink control information for control of a radio channel in an uplink, in a logical area of a radio channel in a downlink.

According to the present invention, it is possible to appropriately assign information to a downlink radio channel without increasing a load on the assignment.

DESCRIPTION OF THE EMBODIMENTS

Next, an embodiment of the present invention will be described with reference to the drawings. Specifically, the embodiment of the present invention will be described in sequence of: (1) Configuration of Radio Communication System, (2) Operations of LTE Base Station, (3) Operations and Effects, and (4) Other Embodiments. In the following embodiments, the same or similar reference numerals are applied to the same or similar parts through the drawings.

Figure 1:
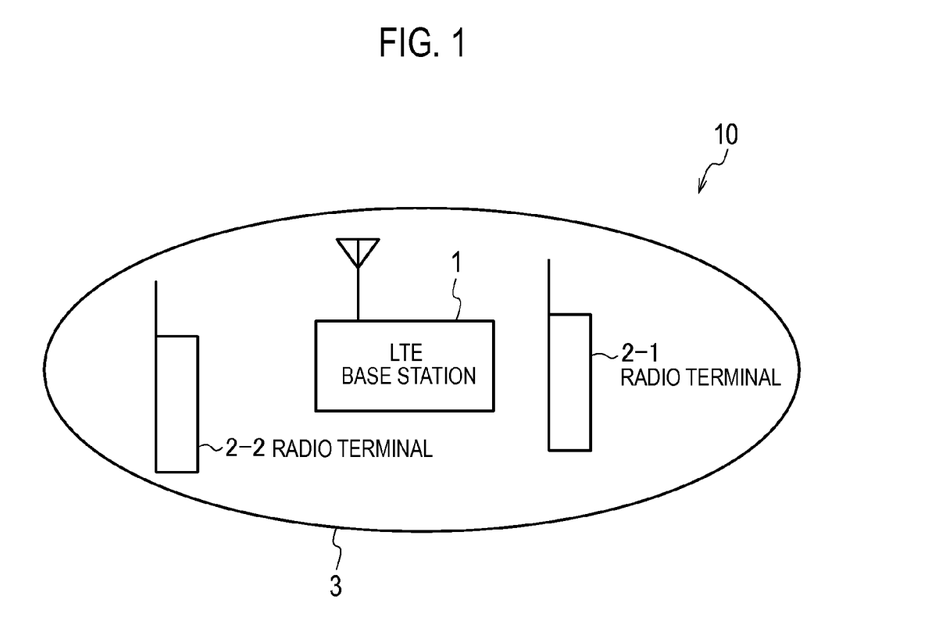
FIG. 1 is an overall schematic configuration diagram of a radio communication system according to an embodiment of the present invention.

(1) Configuration of Radio Communication System (1. 1) Overall Schematic Configuration of Radio Communication System FIG. 1 is an overall schematic configuration diagram of a radio communication system 10 according to an embodiment of the present invention.

The radio communication system 10 shown in FIG. 1 has a configuration based on LTE (Long Term Evolution) which is a standard defined by 3GPP. The radio communication system 10 includes a radio base station (LTE base station) 1, a radio terminal 2-1 and a radio terminal 2-2 (hereinafter, the radio terminal 2-1 and the radio terminal 2-2 are collectively referred to as a "radio terminal 2" as needed) existing in a cell 3. In FIG. 1, the radio terminal 2 exists in the cell 3 formed by the LTE base station 1. The LTE base station 1 performs radio communications with the radio terminal 2 existing in the cell 3. In LTE, a communication scheme between the LTE base station 1 and the radio terminal 2 is referred to as E-UTRAN (Evolved UMTS Terrestrial Radio Access Network). In addition, when transmission error in an uplink occurs, hybrid automatic retransmission (HARQ) is used as retransmission control.

(1. 2) Configuration of LTE Base Station

Figure 2:
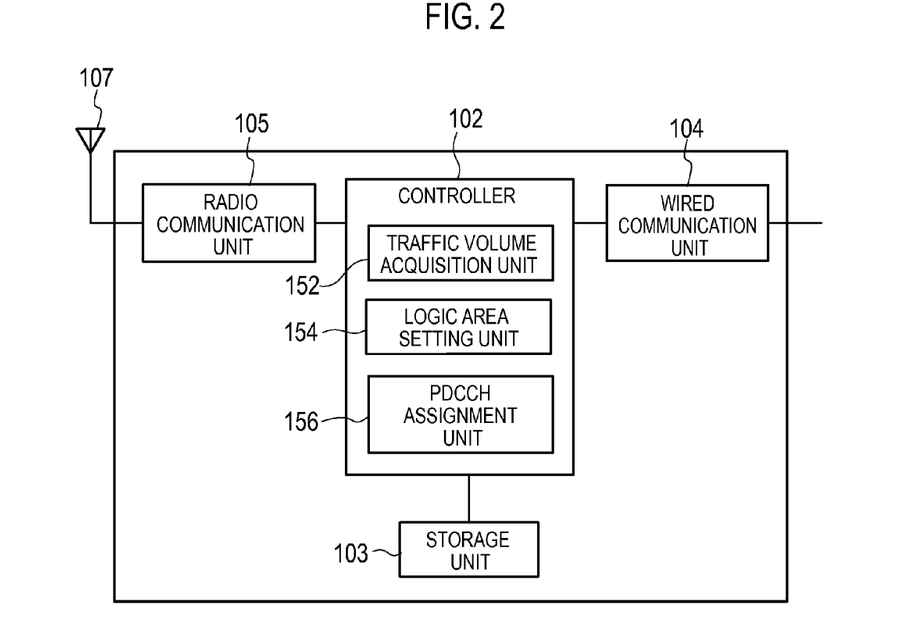
FIG. 2 is a diagram showing a configuration of an LTE base station according to the embodiment of the present invention.

FIG. 2 is a diagram showing a configuration of the LTE base station 1. The LTE base station 1 shown in FIG. 2 includes a controller 102, a storage unit 103, a wired communication unit 104, a radio communication unit 105 and an antenna 107.

The controller 102 is formed for example of CPU (Central Processing Unit) or DSP (Digital Signal Processor), and controls various functions included in the LTE base station 1. The storage unit 103 is formed for example of a memory, and stores various information pieces used for control in the LTE base station 1 and the like. The wired communication unit 104 connects with MME (Mobile Management Entity) and SGW (Serving Gateway) which exist in an unillustrated upper network via an S1 interface. In addition, the wired communication unit 104 connects with another LTE base station, a base station (for example, a picocell base station) having smaller transmission outputs than those of the LTE base station and the like via an X2 interface.

The radio communication unit 105 includes an RF circuit, abase band circuit and the like. The radio communication unit 105 performs modulation and demodulation as well as coding and decoding, and performs transmission and reception of a radio signal to and from the radio terminal 2 via the antenna 107.

As for radio communications between the LTE base station 1 and the radio terminal 2, the controller 102 in the LTE base station 1 assigns an uplink resource block and a downlink resource block each of which is a radio channel, to the radio terminal 2.

The uplink resource block has a time length of one sub-frame period which is a period corresponding to two OFDM symbols, and is formed of PUCCH (Physical Uplink Control CHannel) being a radio channel for control information and PUSCH (Physical Uplink Shared CHannel) being a radio channel for user information. The downlink resource block is formed of PDCCH (Physical Downlink Control CHannel) being a radio channel for control information and PDSCH (Physical Downlink Shared CHannel) being a radio channel for user information.

The controller 102 includes a traffic volume acquisition unit 152, a logical area setting unit 154 and a PDCCH assignment unit 156.

The traffic volume acquisition unit 152 determines whether or not a timing for setting a later-described logical area (logical area) for PDCCH being a downlink radio channel for control information arrives.

To be specific, the traffic volume acquisition unit 152 detects one of the following timings as a timing for setting a logical area: a timing at which time corresponding to the predetermined number of sub-frames has passed since the previous setting of a logical area; a timing at which the LTE base station 1 receives retransmission control information as a retransmission request from the radio terminal 2 in response to the occurrence of error in one of information (uplink assignment control information) for uplink radio channel assignment control and information (downlink assignment control information) for downlink radio channel assignment control which are transmitted to the radio terminal 2 from the LTE base station 1 by using PDCCH; and a timing at which the number of the radio terminals 2 performing radio communications with the LTE base station 1 increases or decreases. In addition, the traffic volume acquisition unit 152 may detect as a timing for the setting, a timing at which a service (for example, FTP or TELNET) in an upper layer received by the traffic volume acquisition unit 152 is changed.

When a timing for setting a logical area has arrived, an uplink resource block and a downlink resource block are assigned to the radio terminal 2. Then, in a state where radio communication is being performed between the LTE base station 1 and the radio terminal 2, the traffic volume acquisition unit 152 acquires an uplink traffic volume and a downlink traffic volume in radio communication.

To be specific, the traffic volume acquisition unit 152 acquires as a traffic volume in an uplink, at least one of the followings: a mean value (uplink average data volume) of a volume of data (uplink data) from the radio terminal 2 in a predetermined period of time; the number of resource blocks in the uplink assigned to the radio terminal 2 for the purpose of transmitting uplink data; a data queue volume in the uplink at a predetermined timing; and a PDCCH volume assigned to the radio terminal 2.

In addition, the traffic volume acquisition unit 152 acquires as a traffic volume in a downlink, at least one of the followings: a mean value (downlink average data volume) of a volume of data (downlink data) to the radio terminal 2 in a predetermined period of time; the number of resource blocks in the downlink assigned to the radio terminal 2 for the purpose of transmitting uplink data; a data queue volume in the downlink at a predetermined timing; and a PDCCH volume assigned to the radio terminal 2.

The logical area setting unit 154 sets a logical area (logical area) for PDCCH being a downlink radio channel for control information.

To be specific, the logical area setting unit 154 reserves a storage area equivalent to a data volume in one PDCCH in the storage unit 103. The storage area is used as a logical area for one PDCCH.

In a state (initial state) where an uplink resource block or a downlink resource block is not assigned to the radio terminal 2 and no radio communications are performed between the LTE base station 1 and the radio terminal 2, the traffic volume acquisition unit 152 does not acquire an uplink traffic volume or a downlink traffic volume.

Figure 3:
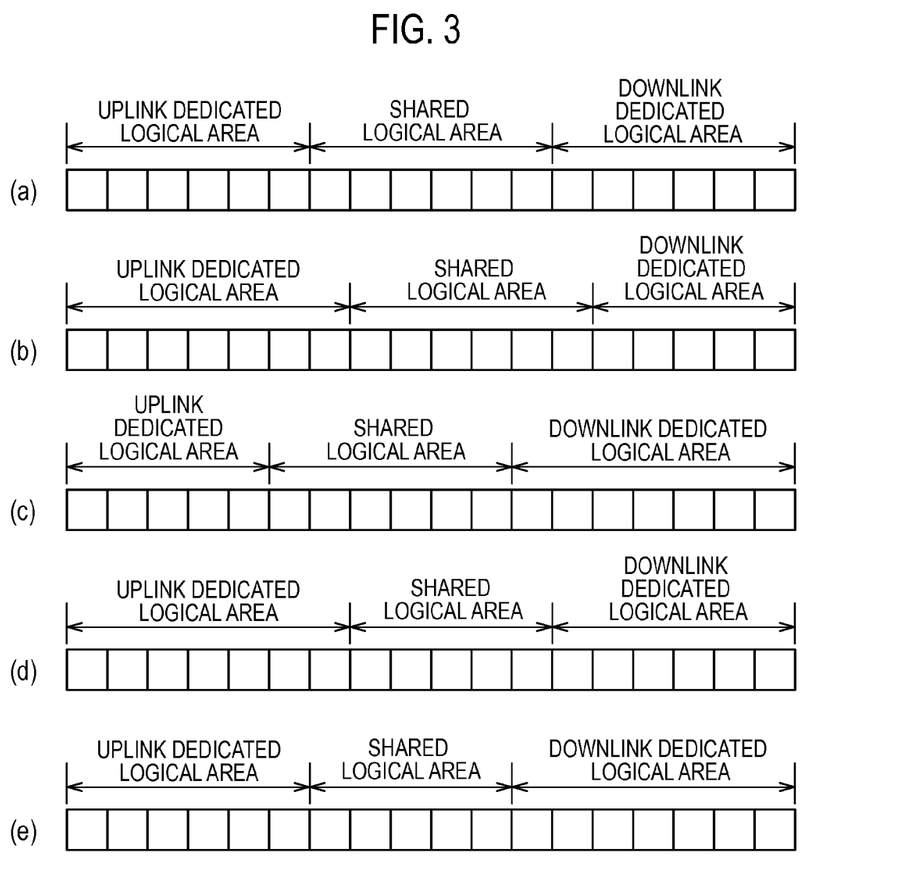
FIG. 3 is an example of a logical area for one PDCCH in the LTE base station according to the embodiment of the present invention.

In this case, the logical area setting unit 154 evenly divides a logical area for one PDCCH into three parts, and sets the following areas: an area (uplink dedicated logical area) dedicated to information (uplink assignment control information) for assignment control of an uplink radio channel; an area (downlink dedicated logical area) dedicated to information (downlink assignment control information) for assignment control of a downlink radio channel; and an area (shared logical area) shared by the uplink assignment control information and the downlink assignment control information. Part (a) of FIG. 3 is a diagram showing a state where a logical area for one PDCCH is evenly divided into three parts to set an uplink dedicated logical area, a downlink dedicated logical area and a shared logical area.

On the other hand, in a state where the radio terminal 2 is assigned an uplink resource block and a downlink resource block and performs communications with the LTE base station 1, the traffic volume acquisition unit 152 has acquired an uplink traffic volume and a downlink traffic volume. In this case, on the basis of the uplink traffic volume and the downlink traffic volume, the logical area setting unit 154 sets an uplink dedicated logical area, a downlink dedicated logical area and a shared logical area in a logical area for one PDCCH.

Here, the logical area setting unit 154 may set an uplink dedicated logical area and a downlink dedicated logical area in such a way that the ratio between an uplink traffic volume and a downlink traffic volume coincides with the ratio between the size of an uplink dedicated logical area and the size of a downlink dedicated logical area, while the size of a shared logical area remains unchanged from that in an initial state. Part (b) of FIG. 3 is a diagram showing a state where an uplink dedicated logical area, a downlink dedicated logical area and a shared logical area are set with the size of the shared logical area remaining unchanged from that in an initial state, and the ratio of an uplink traffic volume to a downlink traffic volume being 7:5. In addition, part (c) of FIG. 3 is a diagram showing a state where an uplink dedicated logical area, a downlink dedicated logical area and a shared logical area are set with the size of the shared logic remaining unchanged from that in an initial state, and the ratio of an uplink traffic volume to a downlink traffic volume being 5:7.

Additionally, the logical area setting unit 154 may set the size of a shared logical area changeable. In addition, the logical area setting unit 154 may set the size of an uplink dedicated logical area larger as an uplink traffic volume acquired by the traffic volume acquisition unit 152 becomes larger and may also set the size of a downlink dedicated logical area larger as a downlink traffic volume acquired by the traffic volume acquisition unit 152 becomes larger. Part (d) of FIG. 3 is a diagram showing a state where an uplink dedicated logical area, a downlink dedicated logical area and a shared logical area are set with the size of the shared logical area being changeable, and an uplink traffic volume being larger than a reference value. In addition, part (e) of FIG. 3 is a diagram showing a state where an uplink dedicated logical area, a downlink dedicated logical area and a shared logical area are set with the size of the shared logical area being changeable, and a downlink traffic volume being larger than a reference value.

Note that in a case where a logical area for one PDCCH includes multiple areas (divided areas) with predetermined sizes, the logical area setting unit 154 may set the number of divided areas corresponding to an uplink dedicated logical area, the number of divided areas corresponding to a downlink dedicated logical area and the number of divided areas corresponding to a shared logical area, on the basis of an uplink traffic volume and a downlink traffic volume.

After an uplink dedicated logical area, a downlink dedicated logical area and a shared logical area are set in a logical area for one PDCCH as described above, the PDCCH assignment unit 156 assigns uplink assignment control information and downlink assignment control information to the logical area for one PDCCH.

Figure 4:
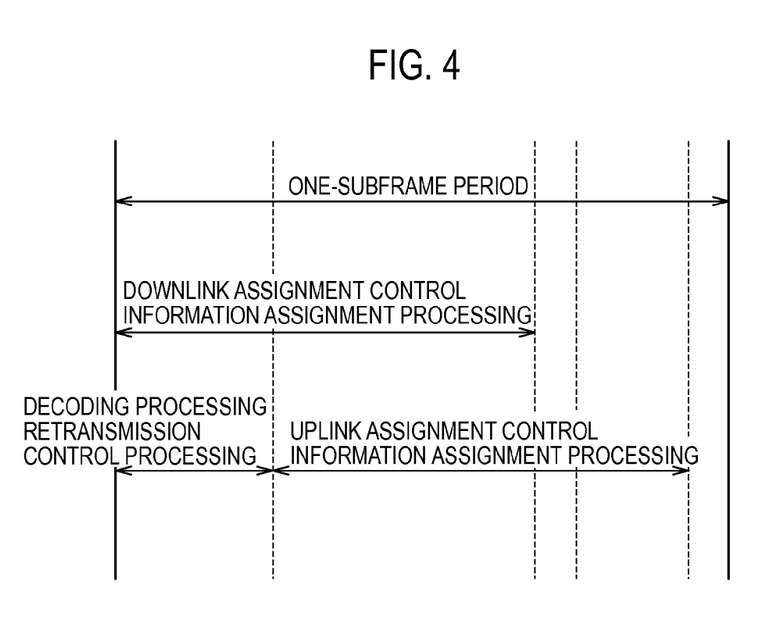
FIG. 4 is a timing chart showing assignment processing in one sub-frame period according to the embodiment of the present invention.

FIG. 4 is a timing chart showing assignment processing of uplink assignment control information and downlink assignment control information in one sub-frame period. At the beginning of one sub-frame period, the PDCCH assignment unit 156 assigns downlink assignment control information to a downlink dedicated logical area. However, after downlink assignment control information is assigned to each downlink dedicated logical area, the PDCCH assignment unit 156 assigns remaining downlink assignment control information to an unassigned area in a shared logical area.

On the other hand, when uplink transmission error occurs, HARQ is used as retransmission control. For this reason, at the beginning of one sub-frame period, the controller 102 needs to perform decoding of a signal transmitted through an uplink, error detection, and generate (retransmission control processing) uplink assignment control information depending on a result of the error detection. Accordingly, the PDCCH assignment unit 156 assigns uplink assignment control information to an uplink dedicated logical area after decoding processing and retransmission control processing are completed. However, after uplink assignment control information is assigned to each uplink dedicated logical area, the PDCCH assignment unit 156 assigns remaining uplink assignment control information to an unassigned area in a shared logical area.

Thereafter, the controller 102 assigns uplink assignment control information and downlink assignment control information assigned to an uplink dedicated logical area, a downlink dedicated logical area, and a shared logical area for one PDCCH to a physical area of PDCCH uniquely determined by frequency band and time, in accordance with the assignment state. The radio communication unit 105 transmits a radio signal corresponding to PDCCH to the radio terminal 2 via the antenna 107.

(2) Operations of LTE Base Station

Figure 5:
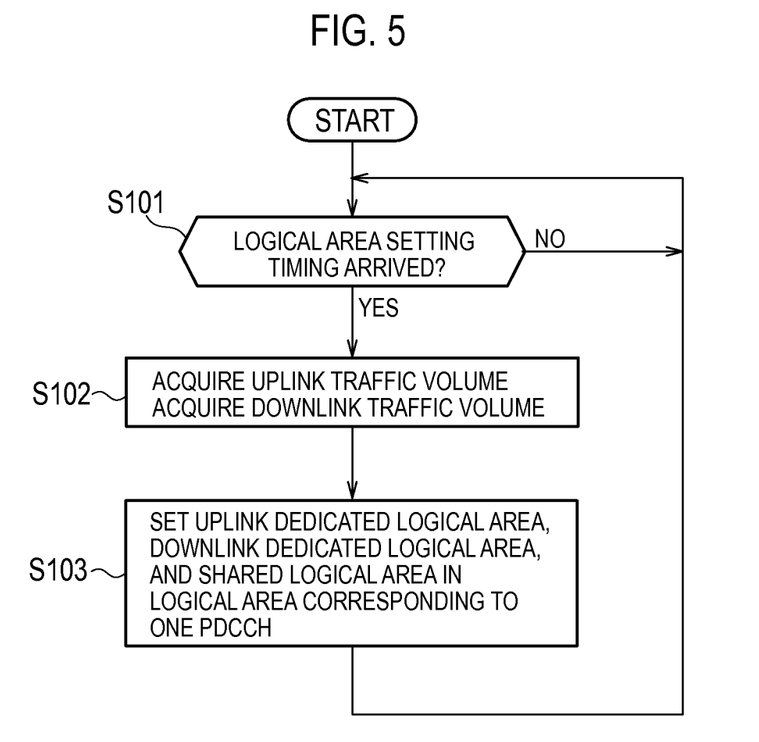
FIG. 5 is a flowchart showing operations for setting logical areas in the radio base station according to the embodiment of the present invention.

FIG. 5 is a flowchart showing operations for setting logical areas in the LTE base station 1. Note that it is assumed as a premise that an uplink resource block and a downlink resource block are assigned to the radio terminal 2, and the LTE base station 1 and the radio terminal 2 are performing radio communications. In addition, it is assumed that a logical area for one PDCCH is already set in the storage unit 103.

In step S101, the LTE base station 1 determines whether or not a timing for setting a logical area has arrived.

When a timing for setting a logical area has arrived, the LTE base station 1 acquires an uplink traffic volume and a downlink traffic volume in the radio communications with the radio terminal 2, in step S102.

In step S103, the LTE base station 1 sets an uplink dedicated logical area, a downlink dedicated logical area and a shared logical area in a logical area for one PDCCH, on the basis of the acquired uplink traffic volume and downlink traffic volume.

(3) Operations and Effects

As described above, in the radio communication system 10 of the embodiment, when a timing for setting a logical area arrives, the LTE base station 1 acquires an uplink traffic volume and a downlink traffic volume in the radio communications with the radio terminal 2. Then, the LTE base station 1 sets an uplink dedicated logical area, a downlink dedicated logical area and a shared logical area in a logical area for one PDCCH, on the basis of the acquired uplink traffic volume and downlink traffic volume.

As shown in FIG. 4, in one sub-frame period, processing for assigning uplink assignment control information to a logical area lags behind processing for assigning downlink assignment control information to the logical area. Still, in the embodiment, at least an uplink dedicated logical area is set in a logical area for one PDCCH and thereby it is possible to prevent a situation where downlink assignment control information is assigned to the entire logical area for one PDCCH. Thus, assignment of uplink assignment control information to a logical area and assignment of downlink assignment control information to a logical area can be performed in a well-balanced manner. In addition, uplink assignment control information can be assigned to a logical area without cooperation or negotiation between assignment processing of uplink assignment control information and assignment processing of downlink assignment control information. Thus, the large load is not imposed on the assignment.

(4) Other Embodiments

As described above, the present invention has been described with the embodiments. However, it should not be understood that those descriptions and drawings constituting a part of the present disclosure limit the present invention. Further, various substitutions, examples, or operational techniques shall be apparent to a person skilled in the art based on this disclosure.

For example, the cell 3 may be divided into multiple sectors. In this case, the LTE base station 1 acquires from each sector an uplink traffic volume and a downlink traffic volume in the radio communications with the radio terminal existing in the sector. Then, the LTE base station 1 sets an uplink dedicated logical area, a downlink dedicated logical area and a shared logical area in a logical area for one PDCCH, on the basis of the uplink traffic volume and the downlink traffic volume.

Additionally, although the radio communication system 10 in the above-described embodiment uses LTE, the present invention is applicable to a radio communication system using another radio communication standard as well.

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-086531 (filed on Apr. 2, 2010) is incorporated herein by reference.

INDUSTRIAL APPLICABILITY

The radio base station and communication control method of the present invention is applicable to a radio base station and communication control method, by which it is possible to appropriately assign information to a downlink radio channel without increasing a load on the assignment.

The invention claimed is:

1. A radio base station configured to assign a radio channel to a radio terminal, comprising
an uplink dedicated area setting unit configured to set one or more areas dedicated to uplink control information for control of a radio channel in an uplink, in a logical area of a radio channel in a downlink; and
an assignment unit configured to:
at the beginning of one sub-frame period, assign downlink control information to an area dedicated to downlink control information for control of a radio channel in the downlink, in the logical area of the radio channel in the downlink, and after downlink assignment control information is assigned to each area dedicated to downlink assignment control information in the logical area of the radio channel in the downlink, assign remaining downlink assignment control information to any unassigned area in a shared area of the logical area of the radio channel in the downlink; and
assign uplink control information to an area dedicated to uplink control information for control of a radio channel in the uplink, in the logical area of the radio channel in the downlink, and after uplink control information is assigned to each area dedicated to uplink control information in the logical area of the radio channel in the downlink, assign remaining uplink control information to any unassigned area in the shared area of the logical area, wherein
the shared area of the logical area is an area shared by both uplink control information and downlink control information, and wherein
the uplink dedicated area setting unit sets at least one of the size and number of areas dedicated to the uplink control information in accordance with a traffic volume in the uplink without changing size of the logical area of the radio channel in the downlink.

2. The radio base station according to claim 1, comprising a downlink dedicated area setting unit configured to set one or more areas dedicated to downlink control information for control of a radio channel in a downlink, in the logical area of the radio channel in the downlink.

3. The radio base station according to claim 2, wherein the downlink dedicated area setting unit sets at least one of the size and number of areas dedicated to the downlink control information in accordance with a traffic volume in the downlink.

4. The radio base station according to claim 1, wherein the size and number of areas dedicated to the uplink control information is set so that a ratio between uplink traffic volume and downlink traffic volume coincides with a ratio between the size of the total uplink dedicated logical area and the size of the total downlink dedicated logical area.

5. The radio base station according to claim 1, wherein the uplink dedicated area setting unit is configured to set the area dedicated to uplink control information for control of a radio channel in the uplink, in the logical area of the radio channel in the downlink prior to generating uplink assignment control information.

6. The radio base station according to claim 1, wherein the area dedicated to uplink control information is set prior to and independent of uplink resource assignment.

7. The radio base station according to claim 1, wherein the uplink dedicated area is set when a predetermined number of sub-frames has passed since the previous setting of a logical area.

8. The radio base station according to claim 1, wherein the uplink dedicated area is set when the radio base station receives retransmission control information as a retransmission request from the radio terminal in response to an error in one of uplink assignment control information and downlink assignment control information transmitted to the radio terminal from the radio base station.

9. The radio base station according to claim 1, comprising:
a shared area setting unit configured to set one or more shared areas dedicated to both uplink control information and downlink control information, in the logical area of the radio channel in the downlink.

10. The radio base station according to claim 9, wherein the shared area setting unit sets at least one of the size and number of shared areas in accordance with a traffic volume in the downlink and a traffic volume in the uplink.

11. A communication control method in a radio base station configured to assign a radio channel to a radio terminal, comprising setting, by the radio base station, one or more areas dedicated to uplink control information for control of a radio channel in an uplink, in a logical area of a radio channel in a downlink;

assigning, by the radio base station at the beginning of one sub-frame period, downlink control information to an area dedicated to downlink control information for control of a radio channel in the downlink, in the logical area of the radio channel in the downlink, and after downlink assignment control information is assigned to each area dedicated to downlink assignment control information in the logical area of the radio channel in the downlink, assigning remaining downlink assignment control information to any unassigned area in a shared area of the logical area of the radio channel in the downlink; and assigning, by the radio base station uplink control information to an area dedicated to uplink control information for control of a radio channel in the uplink, in the logical area of the radio channel in the downlink, and after uplink control information is assigned to each area dedicated to uplink control information in the logical area of the radio channel in the downlink, assigning remaining uplink control information to any unassigned area in the shared area of the logical area, wherein the shared area of the logical area is an area shared by both uplink control information and downlink control information, and wherein at least one of the size and number of areas dedicated to the uplink control information is set in accordance with a traffic volume in the uplink without changing size of the logical area of the radio channel in the downlink.

12. The communication control method according to claim 11, wherein
the size and number of areas dedicated to the uplink control information is set so that a ratio between uplink traffic volume and downlink traffic volume coincides with a ratio between the size of the total uplink dedicated logical area and the size of the total downlink dedicated logical area.

13. The communication control method according to claim 11, wherein
the area dedicated to uplink control information is set prior to and independent of uplink resource assignment.

* * * * *